United States Patent [19]
Jiang

[11] Patent Number: 5,862,042
[45] Date of Patent: Jan. 19, 1999

[54] MULTIPLE OUTPUT DC TO DC CONVERTER

[75] Inventor: Yimin Jiang, Plano, Tex.

[73] Assignee: Lucent Technologies, Inc., Murray Hill, N.J.

[21] Appl. No.: 943,362

[22] Filed: Oct. 3, 1997

[51] Int. Cl.$^6$ .......................... H02M 3/335; H02M 3/24; H02J 3/00; H02J 1/00

[52] U.S. Cl. ................. 363/17; 363/16; 363/80; 307/17; 307/83

[58] Field of Search .................................. 363/15, 16, 17, 363/41, 80, 97, 98, 131, 132; 307/83, 17, 38, 39, 82

[56] References Cited

U.S. PATENT DOCUMENTS

| | | | |
|---|---|---|---|
| 5,162,663 | 11/1992 | Combs et al. | 363/21 |
| 5,400,239 | 3/1995 | Caine | 363/21 |
| 5,663,874 | 9/1997 | Mader et al. | 363/17 |
| 5,712,772 | 1/1998 | Telefus et al. | 363/16 |

*Primary Examiner*—Edward H. Tso
*Assistant Examiner*—Bao Q. Vu
*Attorney, Agent, or Firm*—Locke Purnell Rain Harrell

[57] ABSTRACT

A multiple output dc to dc converter is described that has multiple regulated output voltages. This is achieved by using a common subcircuit in conjunction with multiple input subcircuits to power multiple output circuits. The common subcircuit is used with an input subcircuit to form a converter input circuit which with a corresponding output circuit produces an output voltage. Any number of input subcircuits can be used with the common subcircuit to produce a corresponding amount of output voltages. The multiple output dc to dc converter described produces output voltage of the same quality as using parallel converters but with a cost and complexity similar to that of using inferior secondary side switches for auxiliary outputs.

21 Claims, 4 Drawing Sheets

MULTIPLE OUTPUT DC TO DC CONVERTER

This invention relates to dc to dc power supplies and converters with multiple outputs. More specifically, to a multiple output dc to dc converter that uses a common subcircuit in conjunction with multiple input subcircuits to provide multiple dc output voltages.

BACKGROUND OF THE INVENTION

Most multiple output dc to dc power converters are obtained by either using parallel multiple dc to dc converters, using secondary post regulation or using a combination of both. Since the secondary post regulation is in series with the primary regulation, it is less efficient than using multiple dc to dc converters in parallel. However, using parallel dc to dc converters substantially raises the cost of the converters due to cost of extra or redundant components. What is needed is a scheme that provides the efficiency of parallel converters with costs more similar to that of secondary post regulation schemes.

SUMMARY OF THE INVENTION

The present invention describes a multiple output dc to dc converter that provides the quality of parallel converters without the associated costs. The present invention can be implemented in a number of different topologies, including two-switch forward and two-switch flyback converters as well as full-bridge converters. The multiple output dc to dc converter of the present invention is formed by an input circuit which has a common subcircuit, and input subcircuits for each of the multiple outputs. Each of the input subcircuits includes at least one switch and a means for coupling, which can be a transformer,- the input subcircuit to the output circuit. The common subcircuit is connected to each of the input subcircuits and includes a common switch. The common subcircuit is used in conjunction with each of the input subcircuits to form an input for each transformer. The common switch of the common subcircuit is switched at a fixed duty cycle while the switch of each input circuit is controlled by a separate PWM controller and used to tightly regulate the associated output.

The features and advantages of the invention will become more readily understood from the following detailed description taken in conjunction with the appended claims and attached drawing wherein:

DESCRIPTION OF THE PREFERRED EMBODIMENTS

Figure 1:
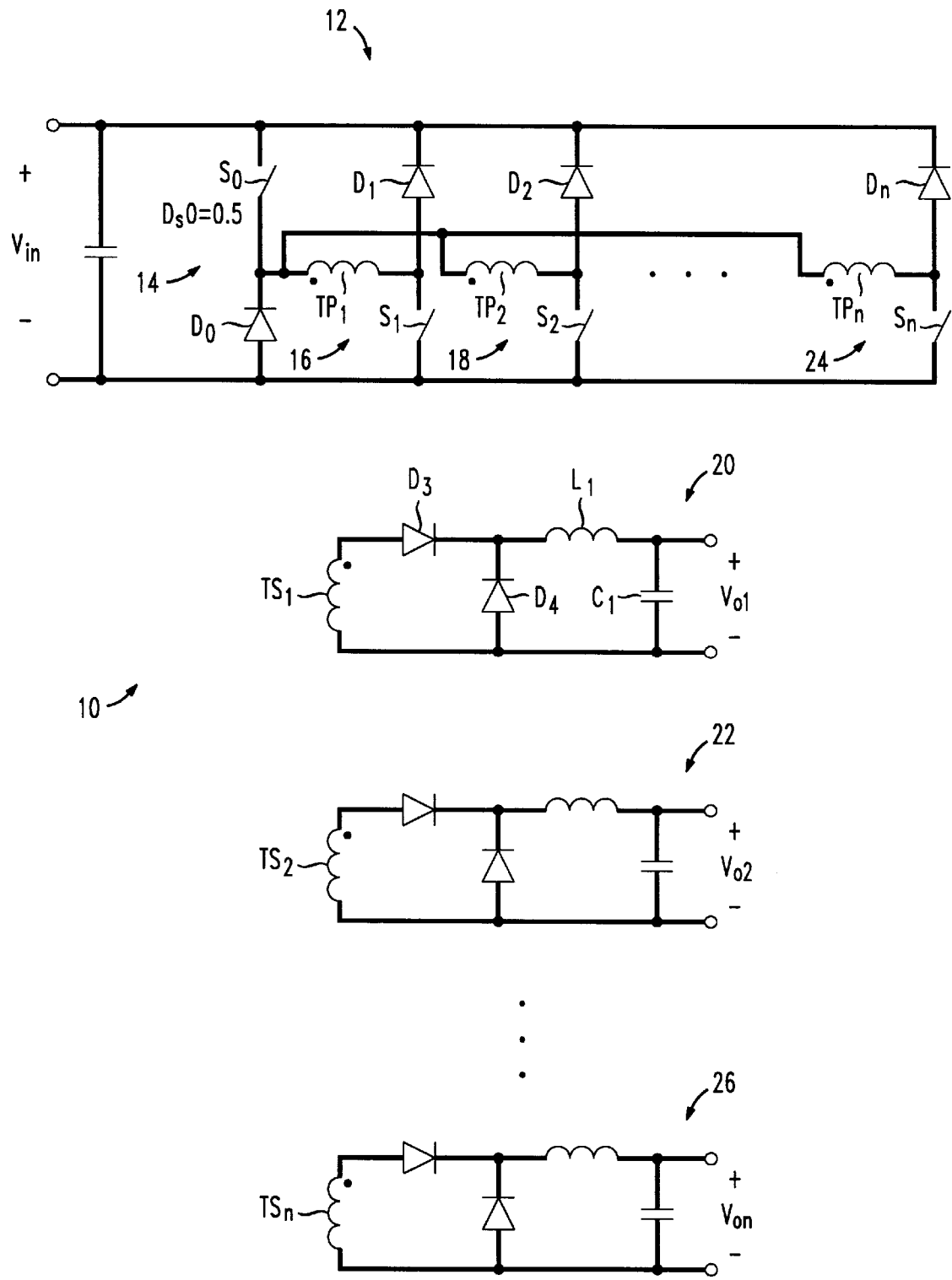
FIG. 1 is a circuit diagram of a multiple output two-switch forward based dc to dc converter according to the present invention.

Referring now to FIG. 1, the preferred embodiment of the present invention with respect to a two-switch forward based converter is shown. Converter 10 includes input circuit 12 which receives input voltage $V_{in}$. As with standard two-switch forward converters, converter 10 uses the action of two switches to create a tightly regulated output voltage with the output being regulated by varying the duty cycle of the switches with a PWM controller in response to changes in the output conditions. In standard two-switch forward converters both switches are controlled by the PWM controller and used to provide a single output. In converter 10, multiple outputs are provided by regulating each output with a single switch controlled by a PWM controller in combination with a common switch operating at a fixed duty cycle. This can be seen in input circuit 12 where common subcircuit 14 includes common switch S0 with diode D0. Common subcircuit 14 is used in conjunction with first input subcircuit 16 to provide first output voltage $V_{o1}$, and with second input subcircuit 18 to provide second output voltage $V_{o2}$. Any number of input subcircuits can be used as illustrated by $n^{th}$ input circuit 24 which provides $n^{th}$ output voltage $V_{on}$.

Converter 10 is formed by input circuit 12 and output circuits 20, 22, and 26. Output circuits 20, 22, and 26 are each coupled to input circuit 12 by a coupling means, which in the preferred embodiment are transformers with primary and secondary windings. These coupling means can any type of electrically or magnetically coupled device or transformer, and can be center tapped or multiple windings. First input subcircuit 16 includes first primary winding TP1 of the transformer formed by first primary winding TP1 and first secondary winding TS1. First input subcircuit also diode D1 and first switch S1 connected to first primary winding TP1. First input subcircuit 16 is used in conjunction with common subcircuit 14 so that when common switch S0 and first switch S1 are both closed they place $V_{in}$ across first primary winding TP1 which induces a voltage across first secondary winding TS1 of output circuit 20. As stated, common switch S0 operates at a fixed duty cycle which is preferably 0.5. Instead of being operated at a fixed duty cycle, first switch S1 is controlled by a PWM controller (not-shown). As is well known in the art, the PWM controller monitors the output voltage and varies the duty cycle of first switch S1, or its phase in relation to that of common switch S0, to keep first output voltage $V_{o1}$ tightly regulated despite changes in the load conditions. When common switch S0 and first switch S1 are both closed, current flows through first primary winding TP1 inducing a current in first secondary winding TS1. Each of first input circuit 16, second input circuit 18 through $n^{th}$ input circuit 24 operate in the same manner to provide n output voltages.

Current in first secondary winding TS1 supplies power to the load through diode D3, capacitor C1 and inductor L1. Capacitor C1 and inductor L1 also ensure a constant output voltage by filtering the output to remove ripple from the output current and voltage. When common switch S0 or first switch S1 is turned off, no current is induced in first secondary winding TS1 and energy is supplied to the load from the discharge of the energy stored in capacitor C1 and inductor L1. The energy stored in inductor L1 is allowed to freewheel through diode D4.

Each additional input subcircuit and output circuit in converter 10 operate as described with respect to first input subcircuit 16 and first output circuit 20. For example, second input subcircuit 18 uses second switch S2 in conjunction with common switch S0 to place $V_{in}$ across primary winding TP2. Current in primary winding TP2 induces a current in secondary winding TS2 which produces second output voltage $V_{o2}$ using second output circuit 22. As can be seen, n outputs of converter 10 can be regulated using $n^{th}$ switch $S_n$, primary winding $TP_n$, and secondary winding $TS_n$, to produce $V_{on}$.

Figure 2:
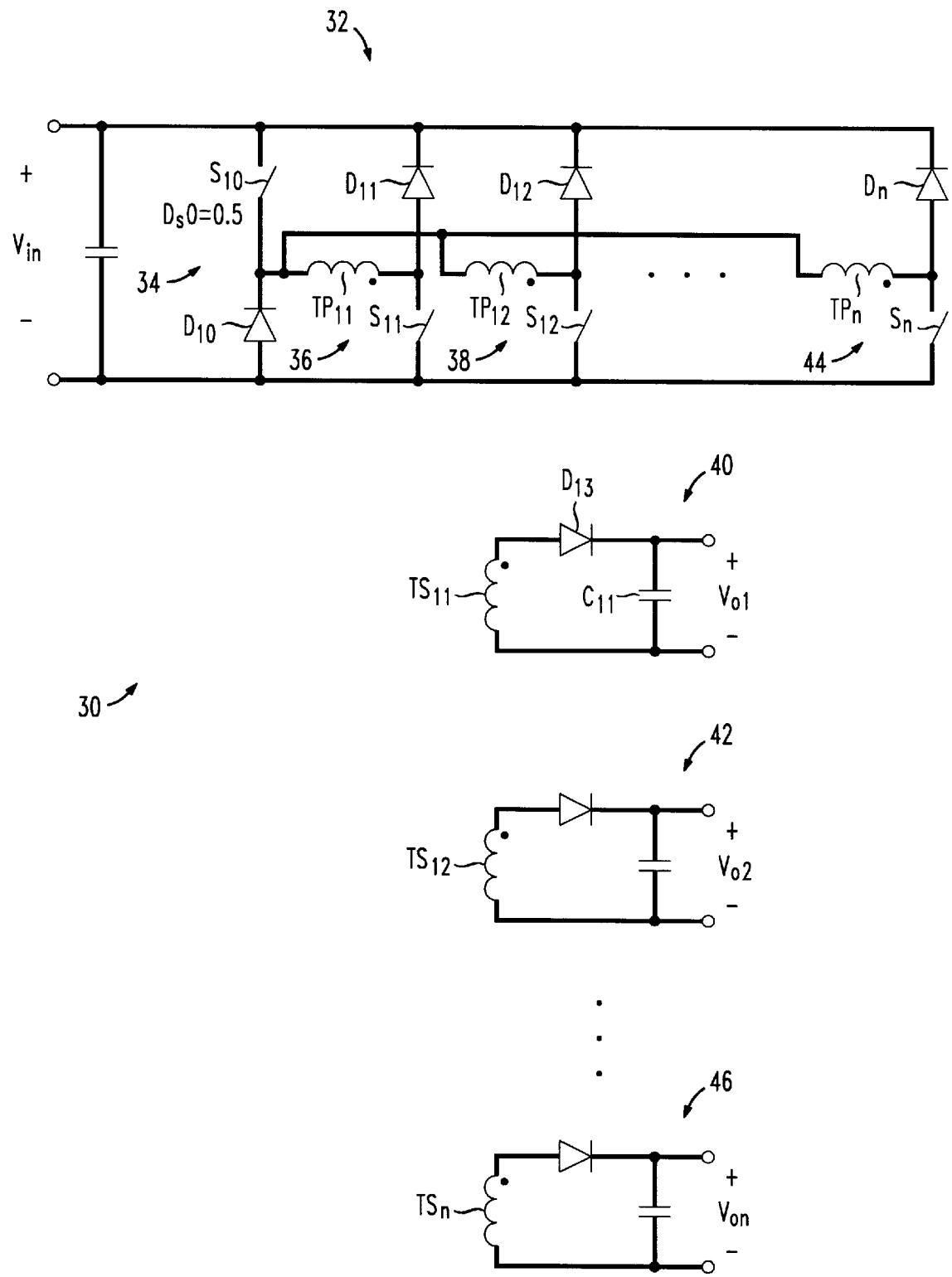
FIG. 2 is a circuit diagram of a multiple output two-switch flyback based dc to dc converter according to the present invention.

Referring now to FIG. 2, the preferred embodiment of the present invention with respect to a two-switch flyback based converter is shown. Flyback converter 30 has the same primary structure as converter 10 from FIG. 1. The differences are in the transformers and the configuration of the output circuits. Common subcircuit 34 is the same as shown in FIG. 1, as are first input circuit 36 and second input circuit 38 with the exception that the polarity of first primary winding TP11 and second primary winding TP12 have been reversed. Again, the ability to handle any number of outputs is demonstrated by $n^{th}$ input subcircuit 44 with $n^{th}$ primary winding TP$_n$. The change in polarization of the primary windings of the input subcircuits allows a flyback type converter to be formed.

As before, common subcircuit 34 with common switch S10 and diode D10 are used in conjunction with the components of the input subcircuits 36, 38 and 44. For example, first switch S11 and diode D11 of first input subcircuit 36 in common input subcircuit 34, place $V_{in}$ across the primary winding TP11 of the transformer. Common switch S10 again operates at a fixed duty cycle while first switch S11, second switch S12 and $n^{th}$ switch $S_n$ of input subcircuit 36, 38, and 44, respectively are each controlled by independent PWM controllers and used to regulate their associated output voltage. With respect to first output voltage $V_{o1}$, common switch S10 and first switch S11 when both closed place $V_{in}$ across first primary winding TP11. $V_{in}$ across first primary winding TP11 causes current to flow through first primary winding TP11. Because of the difference in winding polarities, no current flows in first secondary winding TS11, energy is instead stored in the transformer windings. Once common switch S10 and first switch S11 are opened, the energy stored in the transformer causes current to flow in first output circuit 40 through diode D13. Capacitor C11 is charged during this portion of the cycle and is used to supply power to the load during the period that $V_{in}$ is applied across first primary winding TP11 and no current flows in first output circuit 40.

Both FIGS. 1 and 2 show the top switch of the two-switch converters as the common switch, while n bottom switches are used to regulate the n output voltages. It should be apparent to those skilled in the art that the same result could be obtained by using a common bottom switch with n top switches regulating the n output voltages.

Since the input circuits 12 from FIG. 1 and 32 from FIG. 2 are identical except for the polarization of the primary winding of the transformer, a converter could be structured to have a combination of the output circuits shown in FIGS. 1 and 2 depending on the power requirements for that particular output. For example, the first input subcircuit could be configured as shown by first input subcircuit 16 of FIG. 1 and used with an output circuit as is shown by first output circuit 20 from FIG. 1 thereby forming a forward type converter. The same converter input circuit could have a second input subcircuit configured as shown by first input subcircuit 36 from FIG. 2 used with an output circuit such as the one shown by first output circuit 40 from FIG. 2 thereby forming a flyback type converter. In this way, any combination of the forward or flyback configurations could be used in the same converter circuit to customize the converter to the desired application.

Figure 3:
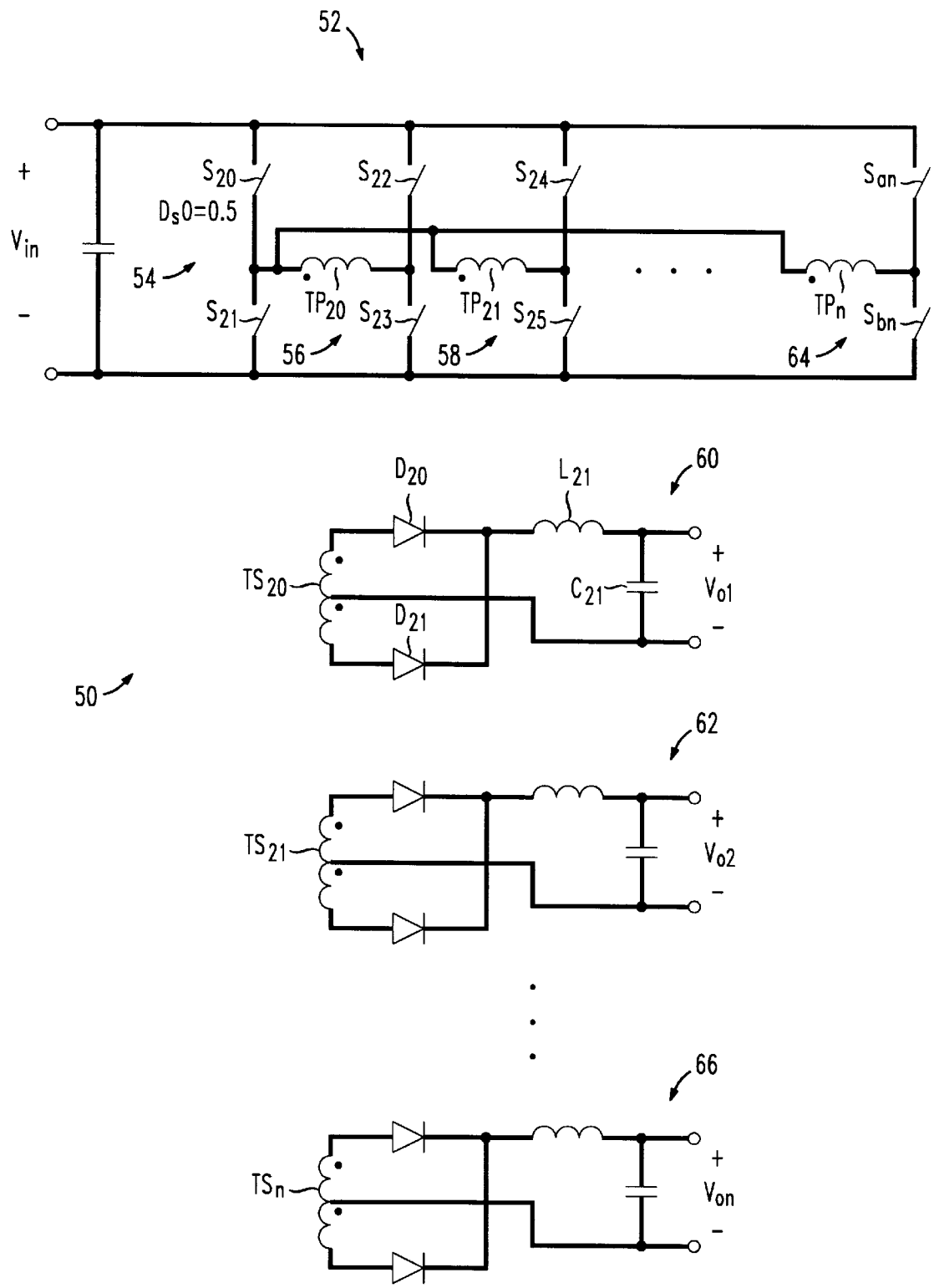
FIG. 3 is a circuit diagram of a multiple output full-bridge based dc to dc converter according to the present invention.

Referring now to FIG. 3, the preferred embodiment of the present invention with respect to a multiple output full-bridge converter is shown. Converter 50 has a very similar input circuit 52 to those shown in the two-switch converters of FIGS. 1 and 2. In the full-bridge configuration, however, input circuit 52 has the diodes of the two-switch converter replaced with switches. These additional switches allow the full-bridge converter to be configured with output circuits that can handle higher power applications.

Input circuit 52 uses common subcircuit 52 with switches S20 and S21 in conjunction with first input subcircuit 56 and second input subcircuit 58. First input subcircuit 56 connects to common subcircuit 54 to form an input circuit that with output circuit 60 forms a full-bridge converter. First input subcircuit 56 includes first top switch S22 and first bottom switch S23 which are connected to first primary winding TP20 of the transformer coupling first input subcircuit 56 to first output circuit 60 using first secondary winding TS20. First input subcircuit 56 operates with common subcircuit 54 as an input circuit for a full-bridge converter. As with input circuits for full-bridge converters, common top switch S20 and first bottom switch S23 when closed result in $V_{in}$ being placed across first primary winding TP20. Similarly, when common bottom switch S21 and first top switch S22 are closed $-V_{in}$ is placed across first primary winding TP20.

$V_{in}$ across first primary winding TP20 causes a voltage across first secondary winding TS20. This results in a voltage across inductor L21 determined by the voltage across secondary winding TS20 less first output voltage $V_{o1}$. The voltage drop across inductor L21 increases the current in first output circuit 60 through forward biased diode D20. This current is then mirrored through the transformer to input circuit 52. During the other half of the cycle $-V_{in}$ is placed across first primary winding TP20. This again results in a voltage across first secondary winding TS20 and a voltage across inductor L21. The voltage across inductor L21 increases the current to flow through the forward biased diode D21. Again, this current is mirrored through the transformer to first primary winding TP20 and input circuit 52.

As before, common top switch S20 and common bottom switch S21 are operated at a fixed duty cycle. A short delay is used between the opening of one switch and the closing of the other to prevent "shoot through" and assure a zero voltage switching. First top switch S22 and first bottom switch S23 have their duty cycle, or phase shift with reference to the common switches, controlled by a PWM controller (not shown) which monitors the conditions of output voltage $V_{o1}$ and varies the duty cycle, or phase shift, of first top switch S22 and first bottom switch S23 to maintain a tightly regulated output voltage. Second input subcircuit 58 through $n^{th}$ input subcircuit 64 operate just as described with first input subcircuit 56. Just as described above second input subcircuit 58 uses second top switch S24 and second bottom switch S25 in conjunction with common top switch S20 and common bottom switch S21 to control the voltage across second primary winding TP21.

Additionally, output circuits 62 with secondary winding TS21 coupled to second primary winding TP21, and $n^{th}$ output circuit 66 with secondary winding $TS_n$ coupled to $n^{th}$ primary winding $TP_n$, operate just as described above with respect to output circuit 60 to produce output voltage $V_{o2}$ and output voltage $V_{on}$, respectively. As illustrated by $n^{th}$ input subcircuit 64 with switches San and Sab, and primary winding $TP_n$, any number of input subcircuits can be accommodated by common subcircuit 54 of input circuit 52.

Common subcircuit 54 of converter 50 can be used not only with input subcircuits and output circuits such as first input subcircuit 56 and first output circuit 60 to form "full-bridge" converters, but can be used with input subcircuits and output circuits either of the types shown by first input subcircuit 36 and first output circuit 40 of FIG. 2 to form a "flyback" converter", or of the type shown by first input subcircuit 16 and first output circuit 20 of FIG. 1 to form a "forward" converter. In this manner, type of converter provided can be selected for the intended load from any of the output circuits described above. Generally; a flyback based converter such as is formed by common subcircuit 34 from FIG. 2 or common subcircuit 54 from FIG. 3, together with first input subcircuit 36 and output circuit 40 from FIG. 2 would be used for low power applications, a forward based converter such as is formed by common subcircuit 14 from FIG. 1 or common subcircuit 54 from FIG. 3, together with input subcircuit 16 and output circuit 20 from FIG. 1 would be used for medium power applications, and a for higher power applications a "full-bridge" converter can be formed as shown with common subcircuit 54, first input subcircuit 56, and first output circuit 60 from FIG. 3. It can be seen that while the input subcircuit and output subcircuit are chosen based on the desired output circuit, common subcircuit 54 can remain constant.

Figure 4:
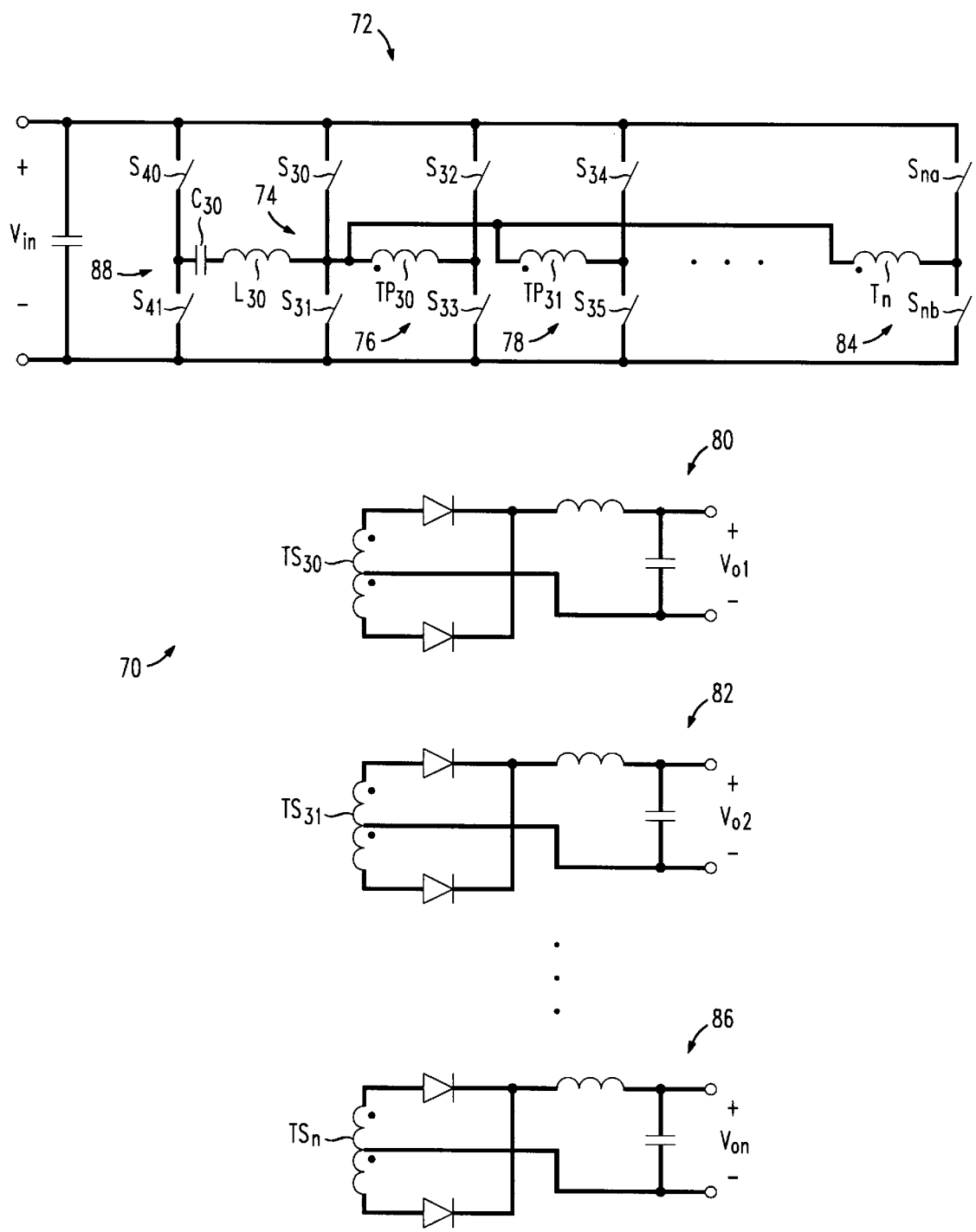
FIG. 4 is the circuit of FIG. 3 modified to achieve a zero current switching condition.

Referring now to FIG. 4, the multiple output, full-bridge converter of FIG. 3 is shown with additional components added which are designed to achieve zero current switching for the switches of the common subcircuit. In high power applications, the common switches can carry significant amounts of current which can result in high turn-off losses when the common switches are opened while still carrying current. In order to reduce these losses, the current in the common switches must be removed before the switch is opened. Converter 70 has zero current switching network 88 added to solve this problem.

Converter 70 is identical to converter 50 of FIG. 3 with respect to both the structure and function of common subcircuit 74, input subcircuits 76, 78, and 84, and output subcircuits 80, 82, and 86. Zero current switching network 88 has been added to converter 70 to remove current from common subcircuit 74, specifically common top switch S30 and common bottom switch S31 for the reasons described above. Zero current switching network 88 is formed by top switch S40, bottom switch S41 and inductor L30 and capacitor C30 which are in series and connected between the junction of top switch S40 and bottom switch S41 and the junction of common top switch S30 and common bottom switch S31.

Zero current switching network 88 operates by forcing a current into or out of the node between common top switch S30 and common bottom switch S31 thereby removing the current which is flowing through whichever of the common switches that is closed just before it is to be opened. For example, when common top switch S30 is closed along with any or all of bottom switches S33, S35, and $S^{nb}$, $V^{in}$ is placed across one or all of primary windings TP30, TP31 and $TP^n$ causing a current to flow down through common top switch S30. Just before common top switch S30 is set to open, top switch S40 of the zero current switching network 88 is closed. Capacitor C30 will have an initial voltage at this point, as will be apparent from the description below, with the potential drop being from right to left when looking at FIG. 4. Closing top switch S40 causes current to be forced into the primary windings through the discharge of capacitor C30 and inductor L30. As secondary windings TS30, TS31 and $TS^n$ will act as current sources and prevent a sudden increase in the current through the associated primary windings, the current supplied by zero current switching network 88 will cause a corresponding reduction of the current through common top switch S30. When the current through common top switch S30 reaches zero or slightly negative, common top switch S30 is opened with the zero current switching condition having been achieved. Top switch S40 remains closed until a short time after the opening of common top switch S30, during which time capacitor C30 is charged to its next initial state, a voltage opposite that just described, for the operation of zero current switching network 88 with respect to bottom switch S41.

When common top switch S30 and bottom switches S33, S35, and $S^{nb}$ are opened, common bottom switch S31 and top switches S32, S34 and $S^{na}$ are then closed to place $-V^{in}$ across the associated primary windings causing current to flow up through common bottom switch S31. Achieving zero current switching of common bottom switch S31 is done as described above except the current flow is in the opposite direction meaning that current must drawn from the primary windings instead of forced into them. Therefore, just before common bottom switch S31 is opened bottom switch S41 is closed causing capacitor C30 and inductor L30 to discharge in the opposite direction as before, drawing current from the primary windings. Since, again, the action of the secondary windings acting as current sources will prevent changes in the current in the primary windings, the current through zero current switching network 88 forces a reduction in the current through common bottom switch S31. When this current is zero or slightly negative, common bottom switch S31 is opened at its zero current condition. Bottom switch S41 stay closed slightly longer which results in capacitor C30 being charged to the initial condition first described.

All of the elements shown in FIGS. 1, 2, 3, and 4 are standard electrical components, and are commonly available. The switches used can be any appropriate switch with a sufficient switching speed, such as semiconductor, IGBT, or magnetic amplifier switches.

It is to be understood that although the invention has been described with particular reference to specific embodiments thereof, the form of the invention shown and described in detail is to be taken as the preferred embodiment of same, and that various changes and modifications may be resorted to without departing from the spirit and scope of the invention as defined by the appended claims.

What is claimed:

1. A multiple output dc to dc converter having at least two output voltages, comprising:

a) at least a first and a second output circuits;

b) at least a first and a second input subcircuits, the first input subcircuit including at least one switch and coupled to the first output subcircuit by a first means for coupling, and the second input subcircuit including at least one switch and coupled to the second output circuit by a second means for coupling; and c) a common subcircuit including at least one common switch connected to the first input subcircuit and the second input subcircuit wherein the at least one common switch is used with each of the at least one switches of the first input subcircuit and the second input subcircuit to produce the at least two output voltages.

2. The multiple output dc to dc converter of claim 1 wherein the first output circuit together with the first input subcircuit and the common subcircuit and the second output circuit together with the second input subcircuit and common subcircuit form two-switch forward-based converters.

3. The multiple output dc to dc converter of claim 1 wherein the first output circuit together with the first input subcircuit and the common subcircuit and the second output circuit together with the second input subcircuit and common subcircuit form two-switch flyback-based converters.

4. The multiple output dc to dc converter of claim 1 wherein the first output circuit together with the first input subcircuit and the common subcircuit form a two-switch forward-based converter and the second output circuit together with the second input subcircuit and common subcircuit form a two-switch flyback-based converter.

5. The multiple output dc to dc converter of claim 1 wherein the first output circuit together with the first input subcircuit and the common subcircuit and the second output circuit together with the second input subcircuit and common subcircuit form full-bridge based converters.

6. The multiple output dc to dc converter of claim 1 wherein the first output circuit together with the first input subcircuit and the common subcircuit form a full-bridge converter and the second output circuit together with the second input subcircuit and common subcircuit form a two-switch forward-based converter.

7. The multiple output dc to dc converter of claim 1 further comprising a zero current switching network connected to the common subcircuit, the zero current switching network operable to remove current from the at least one common switch before the at least one common switch is opened thereby-preventing turn-off losses.

8. The multiple output dc to dc converter of claim 1 wherein the common switch forms a top switch and the at least one switch of each of the first input subcircuit and the second input subcircuit form bottom switches in a two-switch converter.

9. The multiple output dc to dc converter of claim 1 wherein the common switch forms a bottom switch and the at least one switch of each of the first input subcircuit and the second input subcircuit form top switches in a two-switch converter.

10. A two-switch, multiple output dc to dc converter having at least two output voltages, comprising:
 a) a first output circuit producing a first output voltage, and a second output circuit producing a second output voltage;
 b) a first input subcircuit coupled to the first output circuit by a first transformer, and including a first switch connected to the first transformer, and a first diode connected to the first switch and the first transformer;
 c) a second input subcircuit coupled to the second output circuit by a second transformer, and including a second switch connected to the second transformer, and a second diode connected to the second switch and the second transformer; and
 d) a common subcircuit including a common switch and a common diode, the common switch and the common diode connected to each of the first and second input subcircuits thereby forming a two-switch converter for each of the first and second output voltages, wherein the common switch is cycled at a fixed duty cycle and the first switch is used to regulate the first output voltage and the second switch is used to regulate the second output voltage.

11. The two-switch, multiple output dc to dc converter of claim 10 wherein the first output circuit, the first input subcircuit and the common subcircuit, and the second output circuit, the second input subcircuit and the common subcircuit form forward-based converters.

12. The two-switch, multiple output dc to dc converter of claim 10 wherein the first output circuit, the first input subcircuit and the common subcircuit for a forward-based converter, and the second output circuit, the second input subcircuit and the common subcircuit form a flyback-based converter.

13. The two-switch, multiple output dc to dc converter of claim 10 wherein the first output circuit, the first input subcircuit and the common subcircuit, and the second output circuit, the second input subcircuit and the common subcircuit form flyback-based converters.

14. The two-switch, multiple output dc to dc converter of claim 10 wherein the common switch forms a top switch and the at first switch and the second switch form bottom switches in the two-switch, multiple output dc to dc converter.

15. The two-switch, multiple output dc to dc converter of claim 10 wherein the common switch forms a bottom switch and the first switch and the second switch form top switches in the two-switch, multiple output dc to dc converter.

16. A full-bridge, multiple output dc to dc converter having at least two output voltages, comprising:
 a) a first output circuit producing a first output voltage, and a second output circuit producing a second output voltage;
 b) a first input subcircuit coupled to the first output circuit by a first transformer, and including a first top switch connected to the first transformer and a first bottom switch connected to the first top switch and the first transformer;
 c) a second input subcircuit coupled to the second output circuit by a second transformer, and including a second top switch connected to the second transformer and a second bottom switch connected to the second top switch and the second transformer; and
 d) a common subcircuit including a common top switch and a common bottom switch, the common top switch and the common bottom switch connected to each of the first and second input subcircuits to form the multiple input dc to dc converter, wherein the common top switch and common bottom switch are cycled at a fixed duty cycle and the first top switch and first bottom switch are used to regulate the first output voltage and the second top switch and second bottom switch are used to regulate the second output voltage.

17. The full-bridge, multiple output dc to dc converter of claim 16 wherein the first output circuit, the first input subcircuit and the common subcircuit, and the second output circuit, the second input subcircuit and the common subcircuit form full-wave converters.

18. The full-bridge, multiple output dc to dc converter of claim 16 further comprising a third output circuit producing a third output voltage and including a third transformer coupling to the third output circuit to a third input subcircuit which includes a third switch and a diode connected to the third switch, the third input subcircuit being used with the common subcircuit to regulate the third output voltage.

19. The full-bridge, multiple output dc to dc converter of claim 18 wherein the third output circuit, the third input subcircuit and the common subcircuit form a forward-based converter.

20. The full-bridge, multiple output dc to dc converter of claim 18 wherein the third output circuit, the third input subcircuit and the common subcircuit form a forward-based converter.

21. The multiple output dc to dc converter of claim 16 further comprising a zero current switching network connected to the common subcircuit, the zero current switching network operable to remove current from the common top switch and common bottom switch before the common top switch and common bottom switch are opened, thereby preventing turn-off losses.

* * * * *